UNITED STATES PATENT OFFICE.

CHARLES L. BORGMEYER, OF RAHWAY, NEW JERSEY.

MANUFACTURE OF PYROXYLINE COMPOUNDS.

SPECIFICATION forming part of Letters Patent No. 502,921, dated August 8, 1893.

Application filed May 13, 1893. Serial No. 474,114. (No specimens.)

*To all whom it may concern:*

Be it known that I, CHARLES L. BORGMEYER, a citizen of the United States, residing in the city of Rahway, county of Union, and State of New Jersey, have invented certain new and useful Improvements in the Manufacture of Compounds of Pyroxyline; and I do hereby declare that the following is a full, clear, and exact description of the invention, which will enable others skilled in the art to which it appertains to make and use the same.

I have discovered that the artificial or synthetical oil of cassia, that is the chemical compound sold in the market as such, and not the true or natural oil of cassia or oil of Chinese cinnamon, is a powerful active solvent of soluble pyroxyline. This artificial oil is prepared from a mixture of oil of turpentine with a solution of benzoic acid, succinic acid, and cinnamyl in sulphuric ether. The properties of this artificial oil are more valuable than those of the natural oil; it is a stronger active solvent than the latter; it is more limpid and flows more fully; it is less colored; it is more volatile and more quickly drying; it leaves a less porous pyroxyline film; and the film left by it when used with pyroxyline as and in a pyroxyline "dipping" solution is, with the same proportions, more even than with the natural oil. Furthermore it is much cheaper than the natural oil, and is not subject to fluctuations of market price because the output can be made equal to any demand. Pyroxyline is "converted" or dissolved in such proportion of this artificial oil of cassia as is sufficient to moisten the pyroxyline. The artificial oil has all the properties of the true oil of cassia, such as are well known in the art, and the advantages of being a thinner or more fluent liquid, and somewhat more volatile, and much cheaper. I find by trial that it can be used in conjunction with most of the substances with which oil of cassia has been used in the art, and is an advantageous substitute therefor in the art.

What I claim, and desire to secure by Letters Patent, is—

1. The process of manufacturing compounds of pyroxyline which consists of dissolving pyroxyline in artificial or synthetical oil of cassia.

2. A compound of pyroxyline consisting of pyroxyline dissolved in synthetical or artificial oil of cassia.

CHARLES L. BORGMEYER.

Witnesses:
DAVID D. CARNEY,
BYRON KLOTZ.